(12) United States Patent
Bolz et al.

(10) Patent No.: US 9,558,573 B2
(45) Date of Patent: Jan. 31, 2017

(54) OPTIMIZING TRIANGLE TOPOLOGY FOR PATH RENDERING

(71) Applicant: NVIDIA CORPORATION, Santa Clara, CA (US)

(72) Inventors: Jeffrey A. Bolz, Austin, TX (US); Mark J. Kilgard, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 195 days.

(21) Appl. No.: 13/717,458

(22) Filed: Dec. 17, 2012

(65) Prior Publication Data
US 2014/0168222 A1 Jun. 19, 2014

(51) Int. Cl.
*G06T 11/40* (2006.01)
*G06T 11/20* (2006.01)

(52) U.S. Cl.
CPC ............... *G06T 11/40* (2013.01); *G06T 11/203* (2013.01)

(58) Field of Classification Search
CPC ........ G06T 11/203; G06T 11/20; G06T 17/20; G06T 17/205
USPC .................................. 345/423, 441, 442, 17
See application file for complete search history.

(56) References Cited

U.S. PATENT DOCUMENTS

| 6,064,771 | A | 5/2000 | Migdal et al. |
| 7,408,553 | B1* | 8/2008 | Toksvig et al. ............... 345/441 |
| 8,773,432 | B2* | 7/2014 | Brown .......................... 345/423 |
| 2004/0090437 | A1* | 5/2004 | Uesaki et al. ................ 345/420 |
| 2013/0300741 | A1* | 11/2013 | Schmidt .................. G06T 19/20 345/420 |

FOREIGN PATENT DOCUMENTS

CN       1499447 A      5/2004

OTHER PUBLICATIONS

Kolingerova; Simulated Annealing and Genetic Algorithms in Quest of Optimal Triangulations; Generalized Voronoi Diagram; SCI 158, pp. 247-266; Springer-Verlag Berlin Heidelberg 2009.*
Shewchuk; Updating and Constructing Constrained Delaunay and Constrained Regular Triangulations by Flips; SoCG'03; ACM Jun. 8-10, 2003.*

* cited by examiner

*Primary Examiner* — Carlos Perromat
(74) *Attorney, Agent, or Firm* — Artegis Law Group, LLP

(57) ABSTRACT

A technique for efficiently rendering path images tessellates path contours into triangle tans comprising a set of representative triangles. Topology of the set of representative triangles is then optimized for greater rasterization efficiency by applying a flip operator to selected triangle pairs within the set of representative triangles. The optimized triangle pairs are then rendered using a path rendering technique, such as stencil and cover.

17 Claims, 9 Drawing Sheets

OPTIMIZING TRIANGLE TOPOLOGY FOR PATH RENDERING

BACKGROUND OF THE INVENTION

Field of the Invention

The present invention generally relates to path rendering and, more specifically, to optimizing triangle topology for path rendering.

Description of the Related Art

Path rendering represents one style of resolution-independent two-dimensional (2D) rendering that forms a basis for a number of important graphics rendering standards known in the art as PostScript, Java 2D, Apple's Quartz 2D, PDF, TrueType fonts, OpenType fonts, PostScript fonts, scalable vector graphics (SVG), OpenVG, Microsoft's Silverlight, Adobe Flash, Microsoft's XML Paper Specification (XPS), and more.

One class of techniques for performing path rendering includes at least a tessellation step and a path coverage step. Path elements are tessellated into representative triangles in the tessellation step. The path coverage step draws many tessellated triangles, and samples covered by these triangles are counted in a stencil or color buffer, which is used to determine whether each sample is inside or outside an associated path. Front-facing triangles increment covered sample counts and back-facing triangles decrement covered sample counts. Samples counted as inside a path are rendered according to an associated path fill color, while samples counted as outside a path are not rendered to the path fill color.

Many common tessellation techniques generate triangle fans and meshes having very narrow, sliver-like triangles, which typically render with relatively poor efficiency. As a consequence, overall path rendering efficiency and performance may be relatively poor, which can diminish the quality of a user experience.

As the foregoing illustrates, what is needed in the art is a technique for improved path rendering efficiency.

SUMMARY OF THE INVENTION

One embodiment of the present invention sets forth a method for processing a path image for efficient rasterization, the method comprising tessellating one or more contours defining the path image into a first set of triangles, wherein each triangle of the first set of triangles includes a winding order, generating a second set of triangles that are optimized to reduce rasterization cost based on topology and winding order of triangles within the first set of triangles, and saving the second set of triangles Other embodiments of the present invention include, without limitation, a computer-readable storage medium including instructions that, when executed by a processing unit, cause the processing unit to perform the techniques described herein as well as a computing device that includes a processing unit configured to perform the techniques described herein.

One advantage of the disclosed technique is that it improves rendering efficiency of path images rendered by a graphics processing unit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
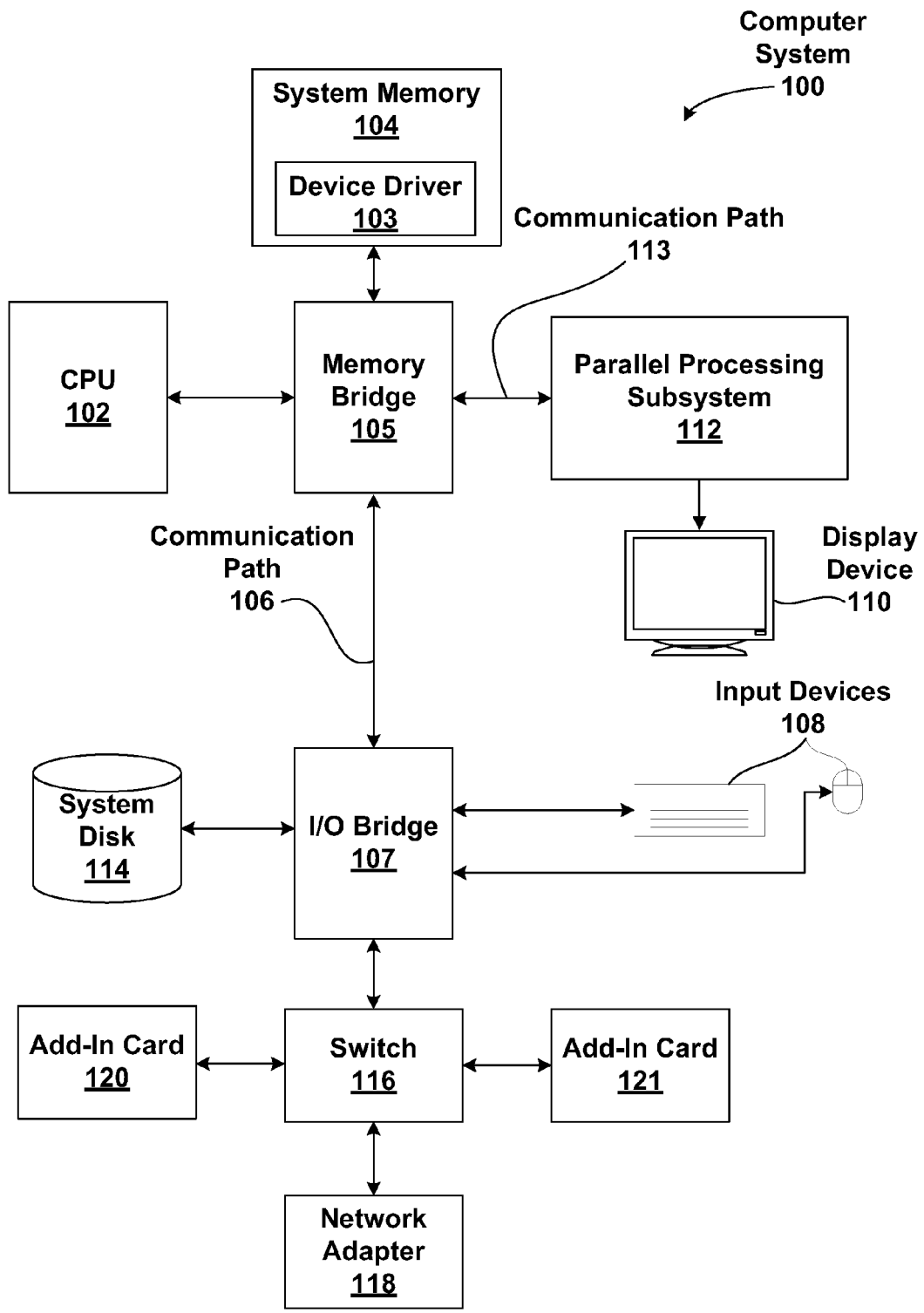
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link). In one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
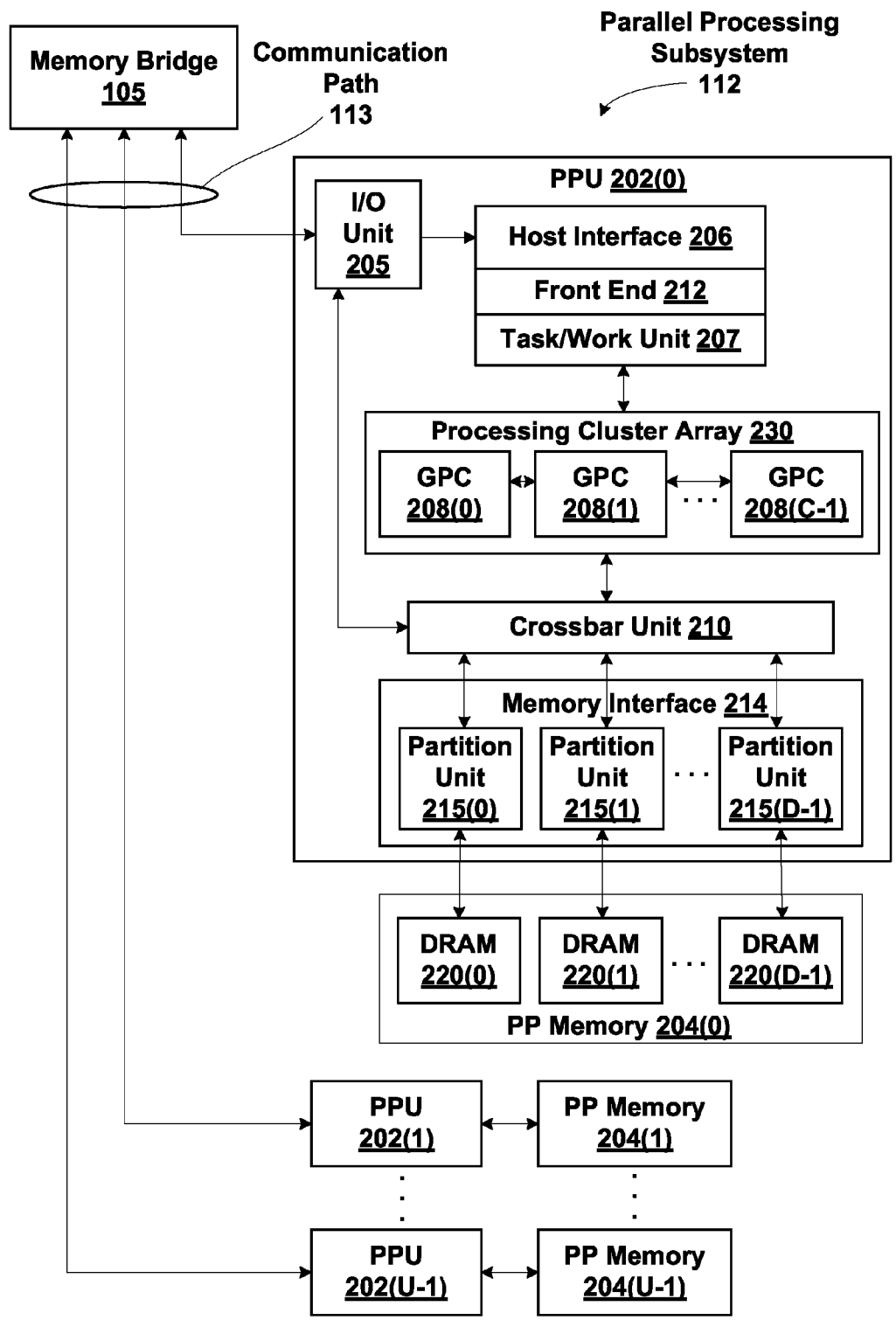
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs 202 may be identical or different, and each PPU 202 may have one or more dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals)

from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where $D \geq 1$. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3:
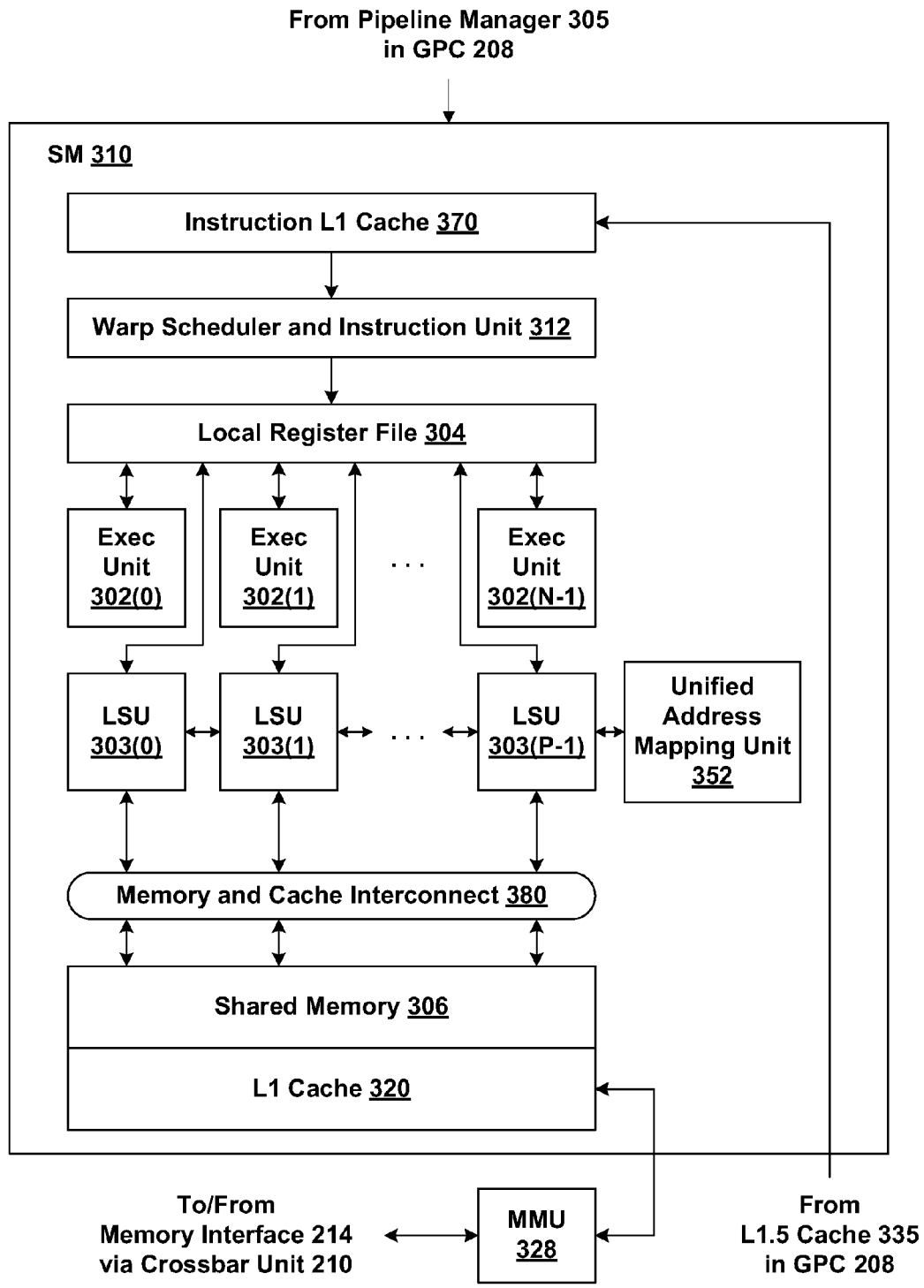
FIG. 3 is a block diagram of a portion of a streaming multiprocessor within the general processing cluster of FIG. 2, according to one embodiment of the present invention.

FIG. 3 is a block diagram of a streaming multiprocessor (SM) 310 within a GPC 208 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager (not shown) that distributes processing tasks to one or more streaming multiprocessors (SMs) 310, where each SM 310 configured to process one or more thread groups. Each SM 310 includes an instruction L1 cache 370 that is configured to receive instructions and constants from memory via an L1.5 cache (not shown) within the GPC 208. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303. The SM functional units may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that a system that, in a GPC 208 that includes $\underline{M}$ streaming multiprocessors 310, up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

It will be appreciated that the core architecture described herein is illustrative and that variations and modifications are possible. Any number of processing units, e.g., SMs 310, may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1-3 in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Figure 4:
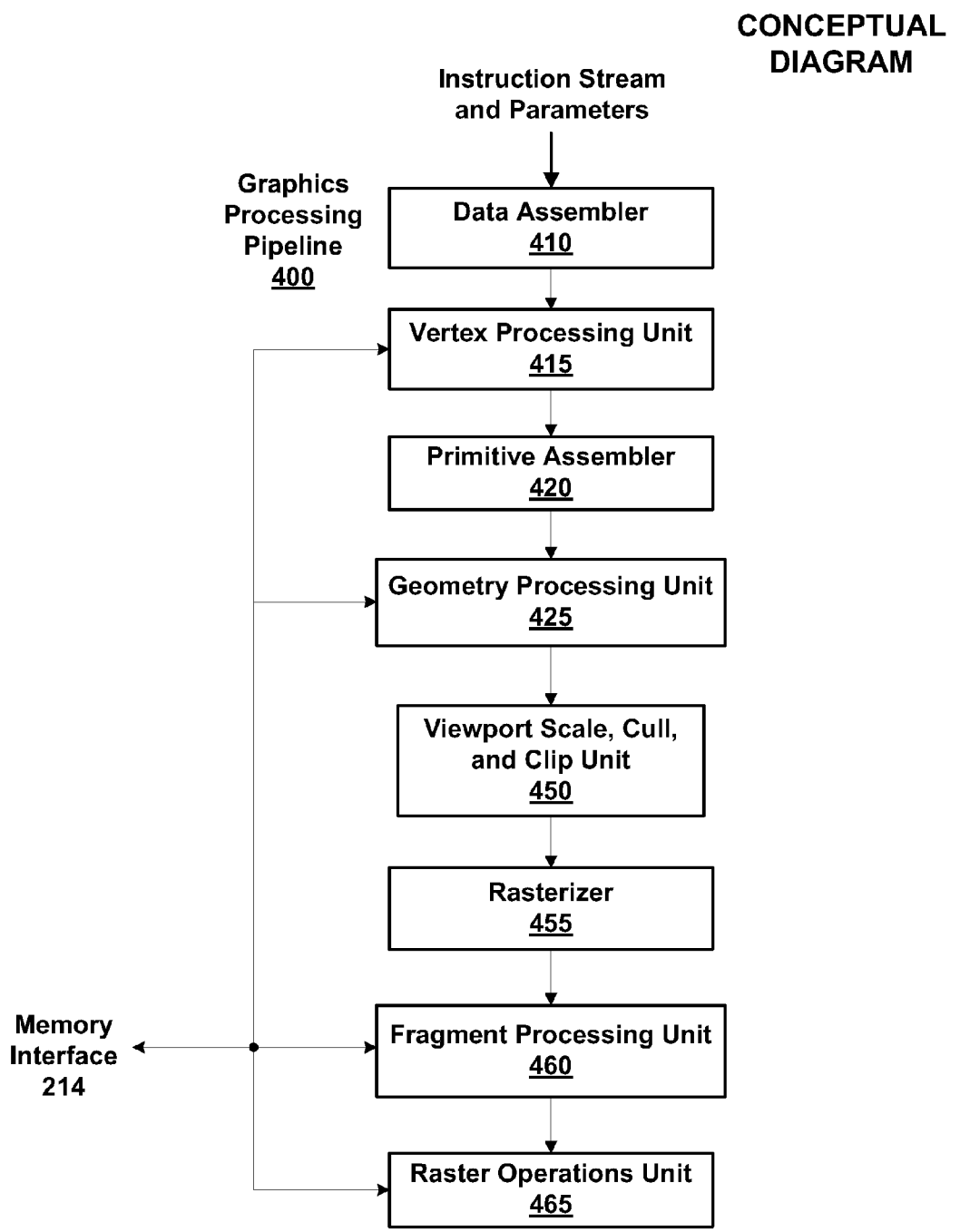
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SMs 310 may be configured to perform the functions of one or more of a vertex processing unit 415, a geometry processing unit 425, and a fragment processing unit 460. The functions of data assembler 410, primitive assembler 420, rasterizer 455, and color raster operations (CROP) unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to CROP unit 465. Fragment processing unit 460 may read data that is stored in parallel processing memory 204 or system memory 104 for use in processing the fragment data. Fragments may be shaded at pixel, sample, or other granularity, depending on the programmed sampling rate.

CROP unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In certain embodiments, each pixel comprises multiple color samples. In such embodiments, CROP unit 465 is configured to compress z sample data, color sample data, or any combination thereof that is written to memory and decompress z sample data and color sample data that is read from memory. The goal of this compression technique is not to reduce the size of an image in memory, but rather to reduce processing associated with the image by representing all samples for a given pixel by one set of sample values that require processing. In a typical scene, a majority of pixels comprise color samples of equal value and this compression technique enables improved processing performance. Multiple color samples are combined to generate an anti-aliased pixel within a resulting image for display or further processing. When all color samples associated with a particular pixel are equal in value, one color sample is stored for the pixel and status information for the pixel is set to indicate that the samples are compressed. In one embodiment, samples associated with a pixel will have equal color when a corresponding fragment fully covers the pixel. Color samples for each pixel within the image may be combined to generate an anti-aliased pixel for display.

Topology Optimization

In certain embodiments, graphics processing pipeline 400 is configured to render an image defined by triangle fans tessellated from complex path elements comprising a path image. The triangle fans are conventionally tessellated about an anchor point to preserve winding numbers of covered samples. The triangle fans sweep along each path element within the path image to cover an area corresponding to path elements within the path image. This type of tessellation process is straightforward and produces correct path coverage and correct sample winding numbers. However, resulting triangles tend to be relatively narrow, leading to inefficiencies in a subsequent rasterization step. Embodiments of the present invention enable improved path rendering performance via topology optimization to increase average triangle width or decrease average triangle area, thereby improving average rasterization efficiency.

In certain embodiments, topology optimization is performed just prior to path rendering of the path image. In other embodiments, topology optimization is performed in conjunction with authoring of the path image. In such embodiments, the path image is then saved with optimized topology. Topology optimization is accomplished through the application of a series of topology flip operations on a set of tessellated triangles that define the path image.

Figure 5A:
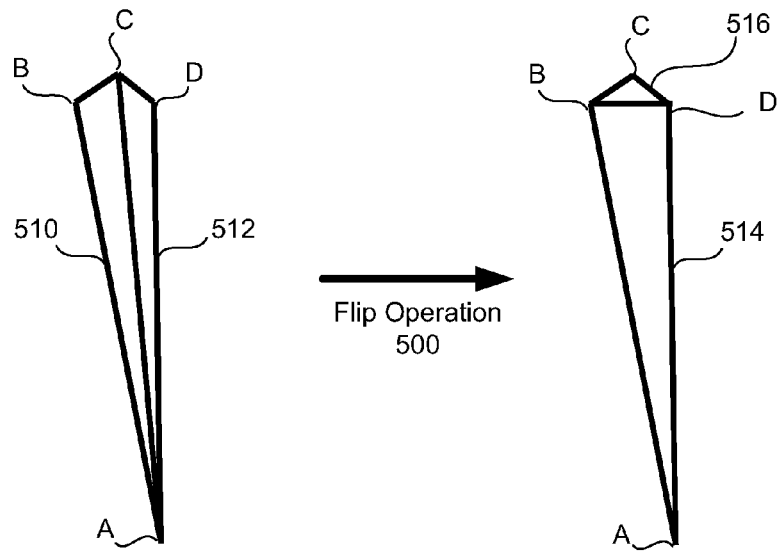
FIG. 5A illustrates a flip operation on a triangle pair tessellated from a path element, according to one embodiment of the present invention.

FIG. 5A illustrates a flip operation 500 on a triangle pair tessellated from a path element, according to one embodiment of the present invention. A given triangle is defined by three vertices and may be uniquely referred to by the three vertices. For example, a triangle having vertices ABC may be referred to as triangle ABC, or simply "$\Delta ABC$." As shown, triangle 510 ($\Delta ABC$) is defined by vertices ABC, triangle 512 ($\Delta ACD$) is defined by vertices ACD, triangle 514 ($\Delta ABD$) is defined by vertices ABD, and triangle 516 ($\Delta BCD$) is defined by vertices BCD. Each triangle has an associated winding order, typically specified as clockwise or counter clockwise. Each triangle also has an associated area, which may be positive when the triangle has a counter clockwise winding order or negative when the triangle has a clockwise winding order. A triangle may be considered front-facing if it has a negative area and back-facing if it has a positive area.

Coverage for each sample within an image is accumulated as a winding number. A default winding number of zero (not covered) is typically assigned prior to rendering. When a back-facing triangle covers a sample, a winding number for the sample is decremented. When a front-facing triangle covers the sample, a winding number for the sample is incremented. Multiple triangles may cover the same sample, and a final winding number for the sample is calculated as a sum of winding numbers for each triangle that covers the sample. Winding numbers for samples within a rendered image may be accumulated within a stencil buffer, color buffer, or other technically feasible buffer comprising a two-dimensional array of values. A given winding number determines whether a corresponding sample is inside an associated path. In a typical implementation, a winding number that is equal to zero indicates that the sample is not inside an associated path, while a winding number that is non-zero indicates that the sample is inside the path. Here, the winding number provides a path inclusion indicator for the sample. In certain alternative implementations, a single status bit is maintained as the path inclusion indicator for each sample. In such implementations, each status bit changes state when covered by a new triangle.

Flip operation 500 receives as input $\triangle ABC$ and $\triangle ACD$, and generates as output $\triangle ABD$ and $\triangle BCD$. Vertices A through D remain geometrically in place and facing attributes for each triangle region are preserved. Furthermore, the area of $\triangle ABC+\triangle ACD$ is equal to the area of $\triangle ABD+\triangle BCD$. One appropriate flip operation is known in the art as a bistellar flip operation.

Figure 5B:
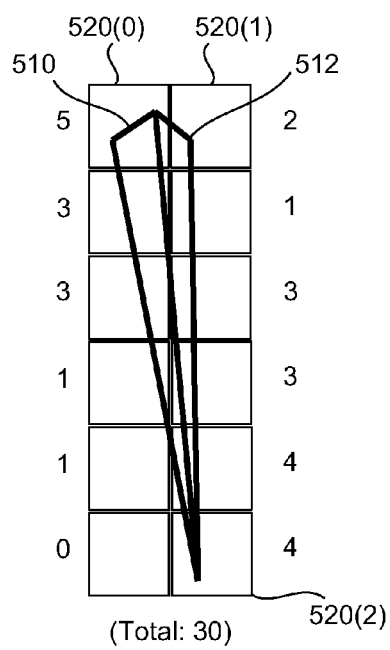
FIG. 5B illustrates processing cost associated with a triangle pair, according to one embodiment of the present invention.

FIG. 5B illustrates processing cost associated with a triangle pair, according to one embodiment of the present invention. In certain rendering architectures, narrow triangles are less efficient to render than wide triangles. In particular, rasterization of a triangle, which may be performed by rasterizer 455 of FIG. 4, incurs a cycle cost of one clock cycle per triangle edge that intersects a fine rasterization region 520. As shown, triangle pair 510, 512 of FIG. 5A is projected onto twelve fine rasterization regions 520. Region 520(0) includes five triangle edges, region 520(1) includes two triangle edges, and region 520(2) includes four triangle edges. Adding up all triangle edges associated with the triangle pair yields a total of thirty triangle edges within the twelve fine rasterization regions, indicating that thirty cycles are required to rasterize the triangle pair.

Figure 5C:
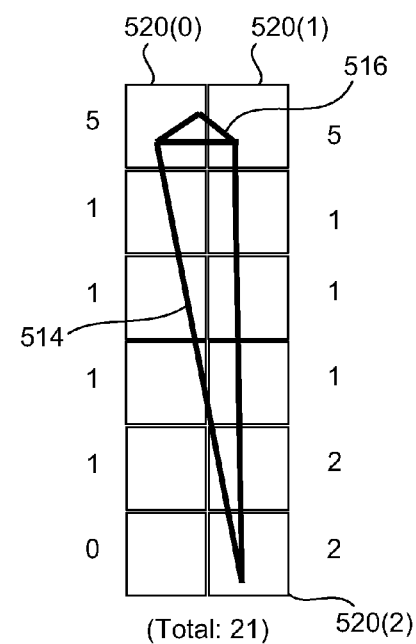
FIG. 5C illustrates processing cost associated with a flipped triangle pair, according to one embodiment of the present invention.

FIG. 5C illustrates processing cost associated with a flipped triangle pair, according to one embodiment of the present invention. As shown, triangle pair 514, 516 of FIG. 5A includes a total of twenty-one triangle edges within fine rasterization regions 520. The total of twenty-one triangle edges indicates that twenty-one cycles are required to rasterize the flipped triangle pair. In this example, a rasterization cost associated with a region covered by triangles 510 and 512 is reduced from thirty cycles to twenty-one cycles as a consequence of representing the region with wider triangles 514 and 516.

Figure 6:
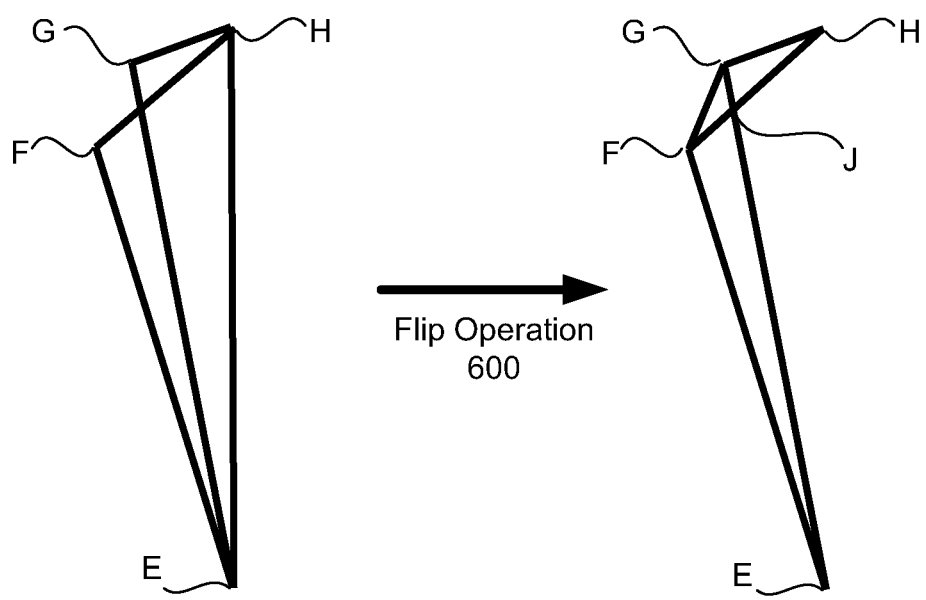
FIG. 6 illustrates a flip operation on a triangle pair having different facing attributes, according to one embodiment of the present invention.

FIG. 6 illustrates a flip operation 600 on a triangle pair having different facing attributes, according to one embodiment of the present invention. Here, $\triangle EGH$ is a front-facing triangle, while $\triangle EHF$ is a back-facing triangle. Because each triangle in the triangle pair has a different facing attribute, winding numbers for samples in overlapping regions of the triangle pair cancel to zero, indicating the path does not cover those samples. Winding numbers for samples in non-overlapping regions are non-zero, indicating the path does cover those samples.

Flip operation 600 generates $\triangle EGF$, which is back-facing and $\triangle GHF$, which is front-facing. Region EJH is not covered by either of triangle $\triangle EGF$ or $\triangle GHF$, and samples residing therein are not altered by either $\triangle EGF$ or $\triangle GHF$. A region FGJ is covered by both $\triangle EGF$ and $\triangle GHF$, and samples residing therein have winding numbers that cancel to zero based on contributions from $\triangle EGF$ and $\triangle GHF$.

As illustrated here by flip operation 500 and flip operation 600, a bistellar flip operation generates triangle pairs suitable for determining coverage for a path associated with the triangle pairs. In the example of FIG. 6, greater rasterization efficiency is gained as a consequence of flip operation 600 because a combination of $\triangle EGF$ and $\triangle GHF$ requires fewer samples to be generated during rasterization than a combination of $\triangle EGH$ and $\triangle EHF$.

Figure 7:
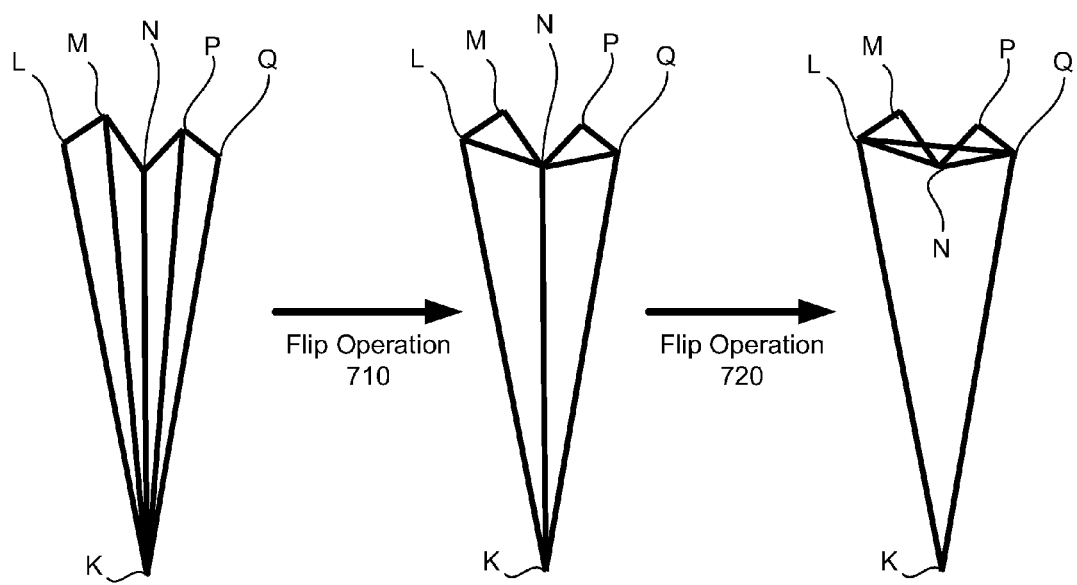
FIG. 7 illustrates sequential flip operations for improved overall topology optimization, according to one embodiment of the present invention.

FIG. 7 illustrates sequential flip operations 710, 720 for improved overall topology optimization, according to one embodiment of the present invention. As shown, flip operation 710 transforms $\triangle KLM$ and $\triangle KMN$ into topology comprising $\triangle KLN$ and $\triangle LMN$. Flip operation 710 also transforms $\triangle KNP$ and $\triangle KPQ$ into topology comprising $\triangle KNQ$ and $\triangle NPQ$. After flip operation 710, each triangle is wider for more efficient rasterization. Flip operation 720 generates $\triangle KLQ$, $\triangle LNQ$, $\triangle LMN$, and $\triangle NPQ$, which are generally wider for yet more efficient rasterization. Using winding numbers to determine which regions are covered yields identical coverage for each different set of four triangles shown.

Figure 8:
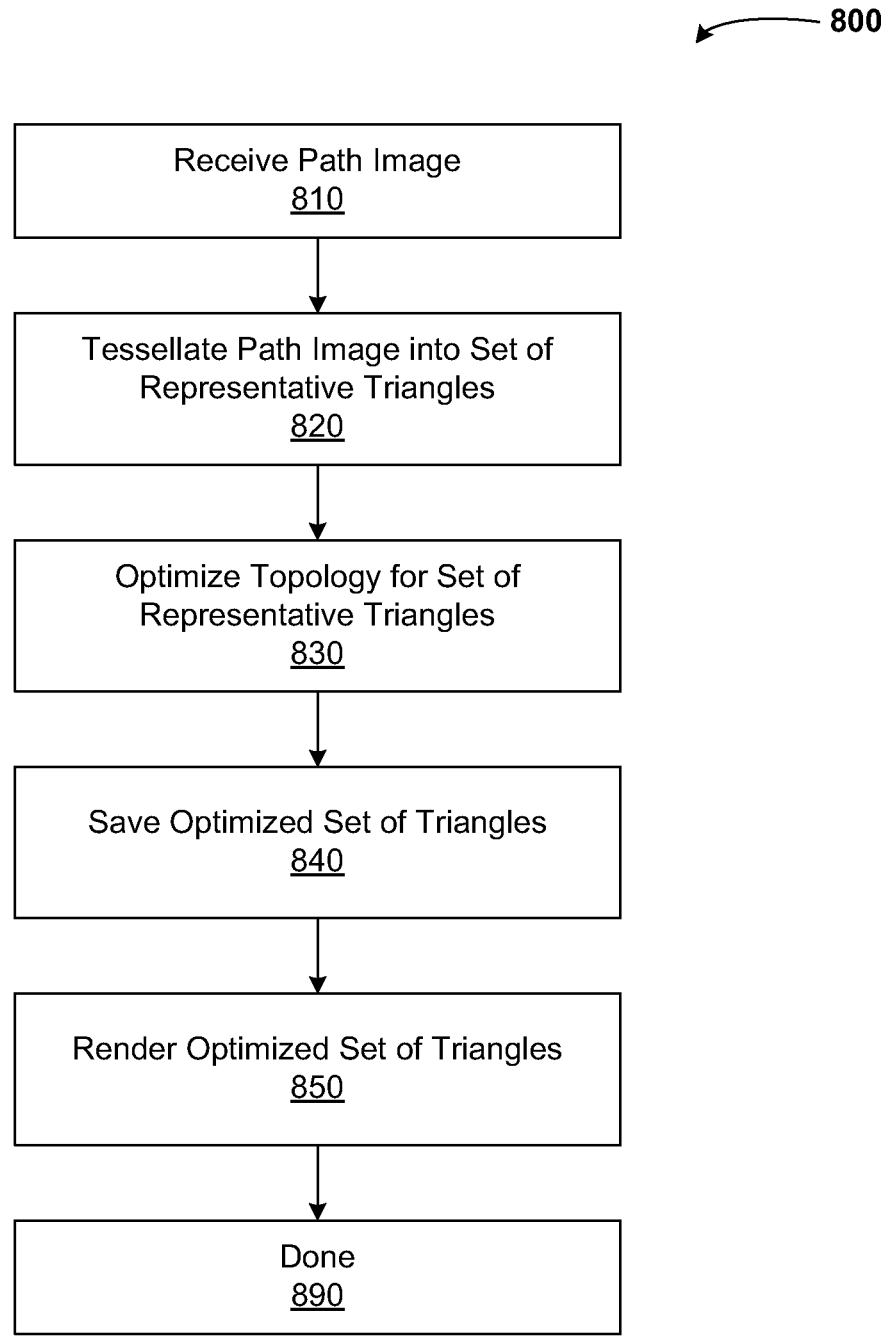
FIG. 8 is a flow diagram of method steps for performing path rendering with optimized triangle topology, according to one embodiment of the present invention.

FIG. 8 is a flow diagram of method steps for performing path rendering with optimized triangle topology, according to one embodiment of the present invention. Although the method steps are described in conjunction with the systems of FIGS. 1-4, persons of ordinary skill in the art will understand that any system configured to perform the method steps, in any order, is within the scope of the invention. In one embodiment, the method steps are performed by a CPU unit, such as CPU 102 of FIG. 1. In another embodiment, the method steps are performed by a GPU unit, such as parallel processing subsystem 112.

As shown, a method 800 begins in step 810, where a path image, comprising path elements, is received. In step 820, the path image is tessellated into a set of representative triangles. One technique for tessellating the path image involves selecting an anchor point, and forming triangle fans around the anchor point. A given triangle comprising a triangle fan may be front-facing or back-facing and may contribute a positive or negative value to winding numbers associated with samples covered by the triangle. The overall set of representative triangles provides a resolution-independent representation of the path image, which may comprise resolution-independent contours.

In step 830, topology for the set of representative triangles is optimized using a flip operator that selectively acts on triangle pairs sharing a common edge. The flip operator is applied to a given triangle pair if a resulting topology is improved according to at least one flip metric, otherwise the flip operator is not applied to that triangle pair. One flip metric is an area sum for triangles comprising a triangle pair. A front-facing triangle and a back-facing triangle that overlap may cancel at least a portion of their respective areas and require less rasterization effort, as illustrated in FIG. 6. This metric is therefore improved when the area sum is decreased. Another flip metric is triangle sliveriness (or narrowness metric) for the pair of triangles, which may be defined as the minimum angle between any two edges associated with the triangle pair. This metric is therefore improved when the minimum angle is increased, widening the narrowest triangle of the triangle pair. One implementation of Step 830 is illustrated in greater detail below in FIG. 9.

In step 840, an optimized set of triangles is saved. The optimized set of triangles may comprise the set of representative triangles and topological optimizations applied thereto. The optimized set of triangles may be saved to a temporary buffer within a memory subsystem for rendering. The optimized set of triangles may also be saved to non-volatile media to be rendered at some future time. In step 850, the optimized set of triangles is rendered to generate a corresponding image having specified resolution. In one embodiment, the optimized set of triangles is rendered according to a path rendering stencil and cover technique. Any technically feasible implementation of a stencil and cover may be implemented without departing the scope and spirit of the present invention. Typical implementations of stencil and cover first render a winding number for each sample of a two-dimensional buffer by accumulating winding numbers for different samples based on covering triangles that define the path image. Then, samples with non-zero winding numbers are covered in the corresponding image to generate a rendering of the path image. The method terminates in step 890.

Figure 9:
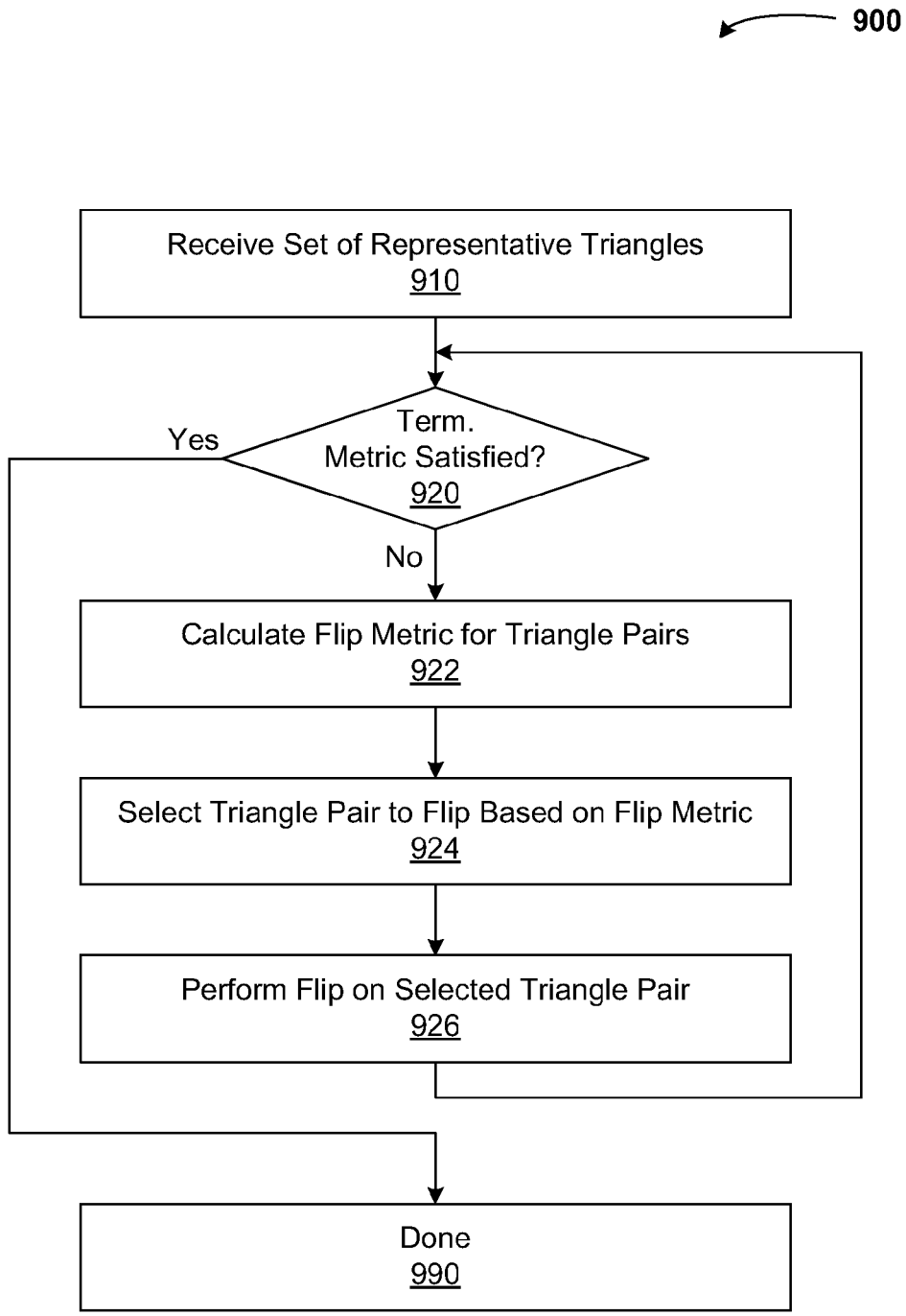
FIG. 9 is a flow diagram of method steps for performing topology optimization, according to one embodiment of the present invention.

FIG. 9 is a flow diagram of method steps for performing topology optimization, according to one embodiment of the present invention. Although the method steps are described in conjunction with the systems of FIGS. 1-4, persons of ordinary skill in the art will understand that any system configured to perform the method steps, in any order, is within the scope of the invention. In one embodiment, the method steps are performed by a CPU unit, such as CPU 102 of FIG. 1. In another embodiment, the method steps are performed by a GPU unit, such as parallel processing subsystem 112.

As shown, method 900 begins in step 910, where a set of representative triangles for a path image is received. The set of representative triangles comprise triangles generated from path image tessellation. If, in step 920, a termination metric is not satisfied, the method proceeds to step 922. A termination metric may include a time-out mechanism, an iteration count threshold, a cost function, or any other technically feasible metric for determining termination. The iteration count may reflect a number of traversals through a working set of triangles, which may include triangles from the set of representative triangles, flipped triangle pairs from the set of representative triangles, or any combination thereof. The working set of triangles includes triangles in an arbitrary optimization state that define the path image.

In step 922, a flip metric is calculated for at least one pair of triangles within the working set of triangles. A flip metric may include an area sum or narrowness metric, described previously in FIG. 8, or any other technically feasible metric that serves to measure relative optimality of a given triangle topology. In step 924, triangle pairs from the at least one pair of triangles that meet a flip metric criterion is selected. In one embodiment, a greedy selection algorithm sequentially traverses all triangles within the working set of triangles and selects triangle pairs that meet a flip metric requirement. In step 926, a flip operation is performed on selected triangle pairs.

Returning to step 920, if a termination metric is satisfied, then the method terminates in step 990.

In sum, a technique is disclosed for efficiently rendering a path image. The path elements, such as contours, comprising the path image are tessellated into a set of representative triangles structured as triangle fans. Triangle pairs selected from the set of representative triangles are optimized for rasterization efficiency using a flip operator on triangle pairs that meet a flip metric requirement. One or more optimization passes may be performed on the set of representative triangles to reduce overall rasterization cost. A resulting set of triangles is then rendered using any technically feasible technique, such as stencil and cover rendering. One advantage of the disclosed technique is that it improves rendering efficiency of path images rendered by a graphics processing unit.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A method for processing a path image to facilitate rasterization, the method comprising:
   tessellating one or more contours that define the path image into a first set of triangles;
   generating a second set of triangles from the first set of triangles by performing a flip operation on a first triangle pair included in the first set of triangles, wherein a sum of triangle areas for two triangles comprising the first triangle pair decreases as a result of the flip operation, and wherein the second set of triangles is configured to reduce a rasterization cost;
   in response, determining that at least one triangle included in the second set of triangles covers a sample, wherein the sample is associated with a path inclusion indicator; and
   performing one or more rendering operations on the at least one triangle that covers the sample.

2. The method of claim 1, wherein each triangle included in the second set of triangles includes a winding order, and wherein the path inclusion indicator comprises a winding number based on a winding order associated with the at least one triangle included in the second set of triangles.

3. The method of claim 1, further comprising rendering an image in an image buffer having a specified resolution by performing the steps of:
   generating a path inclusion indicator for each sample in a stencil buffer, based on the second set of triangles; and
   rendering an image color based on a corresponding path inclusion indicator residing in the stencil buffer.

4. The method of claim 1, wherein tessellating comprises:
   selecting an anchor point for the path image; and
   generating a different triangle fan for each of the one or more contours,
   wherein triangles associated with the one or more triangle fans are included in the first set of triangles.

5. The method of claim 1, wherein generating the second set of triangles comprises:
   calculating a flip metric for one or more triangle pairs included in the first set of triangles;
   selecting at least one triangle pair from the one or more triangle pairs that meets a flip metric criterion;
   performing a flip operation on the at least one triangle pair to generate a resulting triangle pair; and adding the resulting triangle pair to the second set of triangles.

6. The method of claim 5, wherein selecting at least one triangle pair comprises:
traversing the first set of triangles to generate a sequence of triangle pairs;
computing a different flip metric for each triangle pair within the sequence of triangle pairs; and
identifying at least one triangle pair that meets a flip metric criterion.

7. The method of claim 5, wherein the flip operation comprises a bistellar flip operation.

8. A non-transitory computer-readable storage medium including instructions that, when executed by a processor, cause the processor to process a path image for efficient rasterization, by performing the steps of:
tessellating one or more contours that define the path image into a first set of triangles;
generating a second set of triangles from the first set of triangles by performing a flip operation on at least one triangle pair included in the first set of triangles, wherein a sum of triangle areas for two triangles comprising each of the at least one triangle pair decreases as a result of the flip operation, and wherein the second set of triangles is configured to reduce a rasterization cost;
in response, determining that at least one triangle included in the second set of triangles covers a sample, wherein the sample is associated with a path inclusion indicator; and
performing one or more rendering operations on the at least one triangle that covers the sample.

9. The non-transitory computer-readable medium of claim 8, wherein each triangle included in the second set of triangles includes a winding order, and wherein the path inclusion indicator comprises a winding number based on a winding order associated with the at least one triangle included in the second set of triangles.

10. The non-transitory computer-readable storage medium of claim 8, further comprising rendering an image in an image buffer having a specified resolution by performing the steps of:
generating a path inclusion indicator for each sample in a stencil buffer, based on the second set of triangles; and
rendering an image color based on a corresponding path inclusion indicator residing in the stencil buffer.

11. The non-transitory computer-readable storage medium of claim 8, wherein tessellating comprises:
selecting an anchor point for the path image; and
generating a different triangle fan for each of the one or more contours,
wherein triangles associated with the one or more triangle fans are included in the first set of triangles.

12. The non-transitory computer-readable storage medium of claim 8, wherein generating the second set of triangles comprises:
calculating a flip metric for one or more triangle pairs included in the first set of triangles;
selecting at least one triangle pair from the one or more triangle pairs that meets a flip metric criterion;
performing a flip operation on the at least one triangle pair to generate a resulting triangle pair; and
adding the resulting triangle pair to the second set of triangles.

13. The non-transitory computer-readable storage medium of claim 12, wherein selecting triangle pairs comprises:
traversing the first set of triangles to generate a sequence of triangle pairs;
computing a different flip metric for each triangle pair within the sequence of triangle pairs; and
identifying at least one triangle pair that meets a flip metric criterion.

14. The non-transitory computer-readable storage medium of claim 12, wherein the flip operation comprises a bistellar flip operation.

15. A computing device, comprising:
a memory; and
a processing unit coupled to the memory and configured to render a path image by:
tessellating one or more contours that define the path image into a first set of triangles;
generating a second set of triangles from the first set of triangles by performing a flip operation on at least one triangle pair included in the first set of triangles, wherein a sum of triangle areas for two triangles comprising each of the at least one triangle pair decreases as a result of the flip operation, and wherein the second set of triangles is configured to reduce a rasterization cost;
in response, determine that at least one triangle included in the second set of triangles covers a sample, wherein the sample is associated with a path inclusion indicator; and
perform one or more rendering operations on the at least one triangle that covers the sample.

16. The computing device of claim 15, wherein generating the second set of triangles comprises:
calculating a flip metric for one or more triangle pairs included in the first set of;
selecting at least one triangle pair from the one or more triangle pairs that meets a flip metric criterion;
performing a flip operation on the at least one triangle pair to generate at least one resulting triangle pair; and
adding the resulting triangle pair to the second set of triangles.

17. A non-transitory computer-readable storage medium including instructions that, when executed by a processing unit, cause the processing unit to process a path image for efficient rasterization by performing the steps of:
tessellating one or more contours that define the path image into a first set of triangles;
generating a second set of triangles from the first set of triangles by:
calculating a flip metric for one or more triangle pairs included in the first set of triangles or for one or more triangle pairs included in the second set of triangles,
selecting at least one triangle pair from the one or more triangle pairs that meets a flip metric criterion, wherein the flip metric criterion comprises, for a given triangle pair, a determination that a sum of triangle areas for two triangles comprising the given triangle pair will decrease as a result of the flip operation,
performing a flip operation on the at least one triangle pair to generate at least one resulting triangle pair, and
adding the resulting triangle pair to the second set of triangles,
wherein the second set of triangles is configured to reduce a rasterization cost;

determining that at least one triangle included in the second set of triangles covers a sample, wherein the sample is associated with a path inclusion indicator; and performing one or more rendering operations on the at least one triangle that covers the sample.

\* \* \* \* \*